US005096499A

United States Patent [19]

Tilby

[11] Patent Number: 5,096,499

[45] Date of Patent: Mar. 17, 1992

[54] SLITTING APPARATUS FOR SUGARCANE RIND

[76] Inventor: Sydney E. Tilby, 4688 Boulderwood Drive, Victoria, B.C., Canada, V8Y 2P8

[21] Appl. No.: 637,494

[22] Filed: Jan. 4, 1991

[51] Int. Cl.[5] ........................... B02C 7/04; A01F 7/04

[52] U.S. Cl. ........................................ 127/2; 241/236; 460/24; 460/113; 460/150

[58] Field of Search .............. 127/2; 241/236; 460/24, 460/113, 150

[56] References Cited

U.S. PATENT DOCUMENTS 3,567,511 3/1971 Tilby .................................... 127/43

3,797,765 3/1974 Samuels ................................ 241/236

*Primary Examiner*—Theodore Morris

*Assistant Examiner*—P. L. Hailey

*Attorney, Agent, or Firm*—Jansson & Shupe Ltd.

[57] ABSTRACT

A sugarcane rind-slitting apparatus of the type having a pair of counter-rotatable cylindrical members with a multiplicity of intermeshing annular projections. The apparatus includes disks on each cylindrical member, each disk having axially-recessed sides such that the disks of one such member extend into the recession formed by a pair of disks of the other such member. Rind introduced to the apparatus is slit effectively and efficiently by the intermeshing action of the disks, without excessive wear on the disks.

14 Claims, 4 Drawing Sheets

SLITTING APPARATUS FOR SUGARCANE RIND

FIELD OF THE INVENTION

This invention is related generally to apparatus for processing the rinds of sugarcane, sweet sorghum and the like and, more particularly, to apparatus for slitting the rinds.

BACKGROUND OF THE INVENTION

General Background

The stalk of the sugarcane plant includes an outer rind which is a hard, wood-like fibrous substance. The rind surrounds a central core of pith, which bears nearly all of the sugar juice from which various sugar products are made. The outer surface of the rind has a thin, waxy epidermal layer, referred to herein as "dermax."

Conventional sugarcane industry practices until today have utilized sugarcane primarily only for its sugar content. Such industry practices have involved chopping and crushing sugarcane stalks to remove the sugar juice, with the waste solids (bagasse) being used primarily only as fuel, mainly in sugar production operations.

Although such practices have been virtually uniform throughout the industry, it has been recognized that a number of very useful products may be produced from sugarcane if the sugarcane stalk is first separated into its rind, pith and dermax constituents. The many useful end-products made possible by such separation can provide great economic benefit. Such separation also provides significant efficiencies in the production of sugar.

Even though stalk separation efforts began as early as the late 1800's, essentially the entire sugarcane industry continued in the conventional process noted above, involving chopping and crushing of the whole stalk to extract sugar juice.

Technology in this field remained rather dormant until the 1960's, when a resurgence of development activity began, substantially all related to what has been known in the industry as the Tilby system, a cane separation system named after the principal originator, Sydney E. ("Ted") Tilby.

Broadly speaking, the Tilby system includes a multistep operation executed by various portions of a cane separator machine. Sugarcane billets, i.e., cut lengths of cane stalk preferably about 25-35 cm long, are driven downwardly over a splitter to divide them lengthwise into semi-cylindrical half-billets. The two half-billets of a split billet are then processed individually by symmetrical downstream portions of the separator machine.

The first of such downstream portions of the separator is a depithing station which includes a cutter roll and holdback roll for milling pith away from the rind of the half-billet while simultaneously flattening the rind. The next downstream portion is a dermax removal station from which the rind emerges ready for subsequent processing in a variety of ways, including slitting, chipping and/or many other processing steps.

The Tilby system, when finally fully commercialized, can provide substantial outputs of several high-value products. This greatly increases cash yields per ton of sugarcane, a factor of significant importance to an industry in which profitability in recent years has been marginal at best. This is important generally, but is of particular importance to the many developing countries in which a flourishing sugarcane industry would be a boon to economic growth and stability.

Considering that sugarcane is one of the most rapidly growing, easily developed, and readily accessible sources of biomass, full commercialization of the Tilby system can significantly reduce dependence on forests and on certain other crops and resources. Among the products which can be made from sugarcane constituents separated by the Tilby system are a variety of wood products and building materials.

While substantial technical development has occurred over a period of many years with respect to the Tilby system, a number of difficult and critical problems have remained. The failure to overcome such problems has prevented full commercialization of the Tilby system. The invention described and claimed herein is directed to the solution of certain of these problems.

Specific Background

Full commercialization and profitability of the Tilby system depends, in part, on utilization of the large volume of sugarcane rind left after pith and dermax removal. In order for the rind to be used to produce high-value wood products and building materials it is necessary to process it in such a way as to take advantage of its natural fiber strength. It has been found that rind from sugarcane half-billets slit longitudinally into narrow strips of fiber-bundle strands has great utility, for example, in production of structural panels. Tensile fiber strength is retained and utilized in the aforementioned materials.

Early attempts to slit sugarcane rind involved the use of an apparatus referred to in the prior art as a reel shredder, an example of which is seen in Tilby U.S. Pat. No. 3,567,511. Rind was shredded longitudinally as it was driven through a pair of counter-rotatable cylindrical members having a multiplicity of intermeshing spaced annular projections. Individual strands were spread apart by the compressive mechanical shearing action of such intermeshing projections.

While such devices of the prior art were able to function, the prior art has associated with it a number of significant problems and deficiencies. Most are related to constricted flow of rind into the slitting apparatus, and result from the general configuration of the slitter apparatus.

One major problem is that projections of the prior art become dull quickly, after very little use. Typically, the disks of each set have a constant axial dimension across their diameter. One set is precisely intermeshed with another for the purpose of cleanly slitting the rind. Wear results in incomplete and inefficient slitting, which hinders movement of the rind through the slitter apparatus. Worn projections also tend to tear the rind fibers, reducing their tensile strength and adversely affecting the quality of any subsequent rind product.

Another related concern is that projections are often irreparably damaged by shearing forces created by rind moving through the slitter apparatus in a misaligned fashion. The rigid projection mounting arrangement of the prior art tended to cause damage to the projections under pressure of this sort.

Another related concern is high cost of slitter apparatus of the prior art. The precision needed to provide the proper intermeshing projections requires costly and time-consuming skilled labor. But, regardless of costs, precision is quickly lost as the projections dull, requiring replacement or additional machining.

Another significant problem is that sugarcane rind often plugs the slitting apparatus. The projections of certain prior art slitters do not always engage the rind properly; instead, slipping of projection edges on the rind material can reduce the throughput rate and lead to a buildup of unslit rind. This condition not only reduces efficiency, but can cause damage to the slitter apparatus.

In summary, a considerable number of drawbacks and problems exist in the prior art relating to sugarcane rind-slitting. There is a need for an improved rind slitter to more readily utilize the commercial potential of sugarcane rind and of the Tilby sugarcane separation system.

OBJECTS OF THE INVENTION

It is an object of this invention to provide an improved sugarcane rind-slitting apparatus overcoming some of the problems and shortcomings of the prior art.

Another object of this invention is to provide an improved rind-slitting apparatus allowing quick adjustment for problems related to projection wear, without the need for costly replacement or extensive downtime of the separation system.

Another object of this invention is to provide a sugarcane rind-slitting apparatus which remains sharp over extended use.

Another object of this invention is to provide an improved slitter apparatus which slits sugarcane rinds and the like completely and efficiently in shorter periods of time.

Another object of this invention is to provide an improved slitting apparatus which does not require costly precision machining.

Another object of this invention is to provide an improved slitting apparatus which allows inexpensive replacement of components as necessary.

Another object of this invention is to provide a slitter with an improved projection attachment system which accommodates varying pressures without damage to projections.

These and other important objects will be apparent from the descriptions of this invention which follow.

SUMMARY OF THE INVENTION

This invention is an improved rind-slitting apparatus for use in sugarcane separation systems. The invention overcomes certain problems and deficiencies, including those outlined above.

An important aspect of this invention is an improved intermeshing disk arrangement, including a preferred disk configuration. The inventive arrangement allows large volumes of sugarcane rind to be slit quickly and effectively, without excessive maintenance. The disks remain sharp over extended use to insure the rind is slit cleanly. Products derived therefrom gain full benefit of the inherent tensile strength of the rind fibers. Any disk wear may be compensated for by quick adjustment thereof along the shaft. Production proceeds efficiently and economically, without prolonged downtime for repair or replacement.

This invention is a sugarcane rind-slitting apparatus having a pair of counter-rotatable cylindrical members with a multiplicity of intermeshing annular projections, each of which has two sides and a peripheral end. The projection sides are axially-recessed beginning at a radial position spaced from the peripheral end by a distance less than the radial extent of intermeshing overlap. Each recess extends radially inwardly at least to a position spaced from the peripheral end by a distance greater than the radial extent of intermeshing overlap of the annular projections. The axial dimension of each recess is substantially greater than the thickness of the sugarcane rind to be slit, such that the rind may be cleared from between the annular projections.

In preferred embodiments, each cylindrical member includes (1) a shaft, (2) disks on the shaft forming the intermeshing annular projections, (3) flexible means on the shaft to space the intermeshing disks, and (4) means at the shaft ends to allow axial tightening of the disks. In highly preferred embodiments, each flexible spacer is an O-ring engaging the shaft with an uncompressed axial dimension greater than the axial dimension of the peripheral end of the disk received between the disks on either side of the O-ring.

In highly preferred embodiments, each shaft has at least four splines thereon, and each disk has at least four tabs mating therewith, such that disk-cocking is avoided. Likewise, in highly preferred embodiments, the peripheral ends of the annular projections of both cylindrical members are knurled to better grip and move sugarcane rind through the slitting apparatus.

As already noted, a sugarcane separation system has certain inherent advantages. The rind-slitting apparatus of this invention allows those advantages to be more fully realized. The present invention makes use of disks having recessed annular portions on both sides thereof. The recessions on both sides of each disk receive the peripheral end of a disk attached to the opposite shaft. When the disks attached to one shaft are intermeshed with those on the other, the counter-rotating motion of one set through the recessions on the other helps to maintain the degree of sharpness on the disk edges necessary to slit the sugarcane rind cleanly and effectively.

Nonetheless, some wear is inevitable along the axial dimension of the disks. Disk-locator collars and lock nuts at both ends of each shaft work in conjunction with O-ring spacers between the disks to allow axial tightening of the disks. The O-rings are compressible and allow the disks to be brought together by tightening the lock nut and collar combination to compensate for a small degree of disk wear.

Any slitting apparatus involving large volumes of sugarcane rind would invariably experience stress forces which tend to twist and cock the disks out of their planes of rotation about the shaft. This tends to cause breakage of components. Downtime for repair, of course, causes loss of production and increased costs.

The O-rings and the multiple splines on the shafts of the present invention work together to perform an pressure-absorbing function. The rings are relatively loosely mounted and flexible. The multiple disk tabs move enough in the shaft splines to avoid cocking of the disks. Forces such as the type described above are avoided or absorbed to the extent necessary to reduce the possibility of disk damage.

Disks of the present invention are cost-efficient. They are relatively inexpensive to make and easy to replace, if necessary, relative to the costly precision machined projections of the prior art.

Sugarcane separation generates large volumes of rind. Economies of scale in rind processing require that the rind move through a slitting apparatus as quickly and effectively as possible. The slitting apparatus of this invention allows sugarcane rind to be slit quickly, efficiently, and in a manner such that optimal fiber strength is imparted to the products derived therefrom.

The slitting apparatus of this invention avoids the excessive wear and precision problems of the prior art. A longer effective apparatus lifetime without the minimal need for replacement or repair adds to the economy and commercialization potential of the entire separation process.

DETAILED DESCRIPTIONS OF PREFERRED EMBODIMENTS

Figure 1:
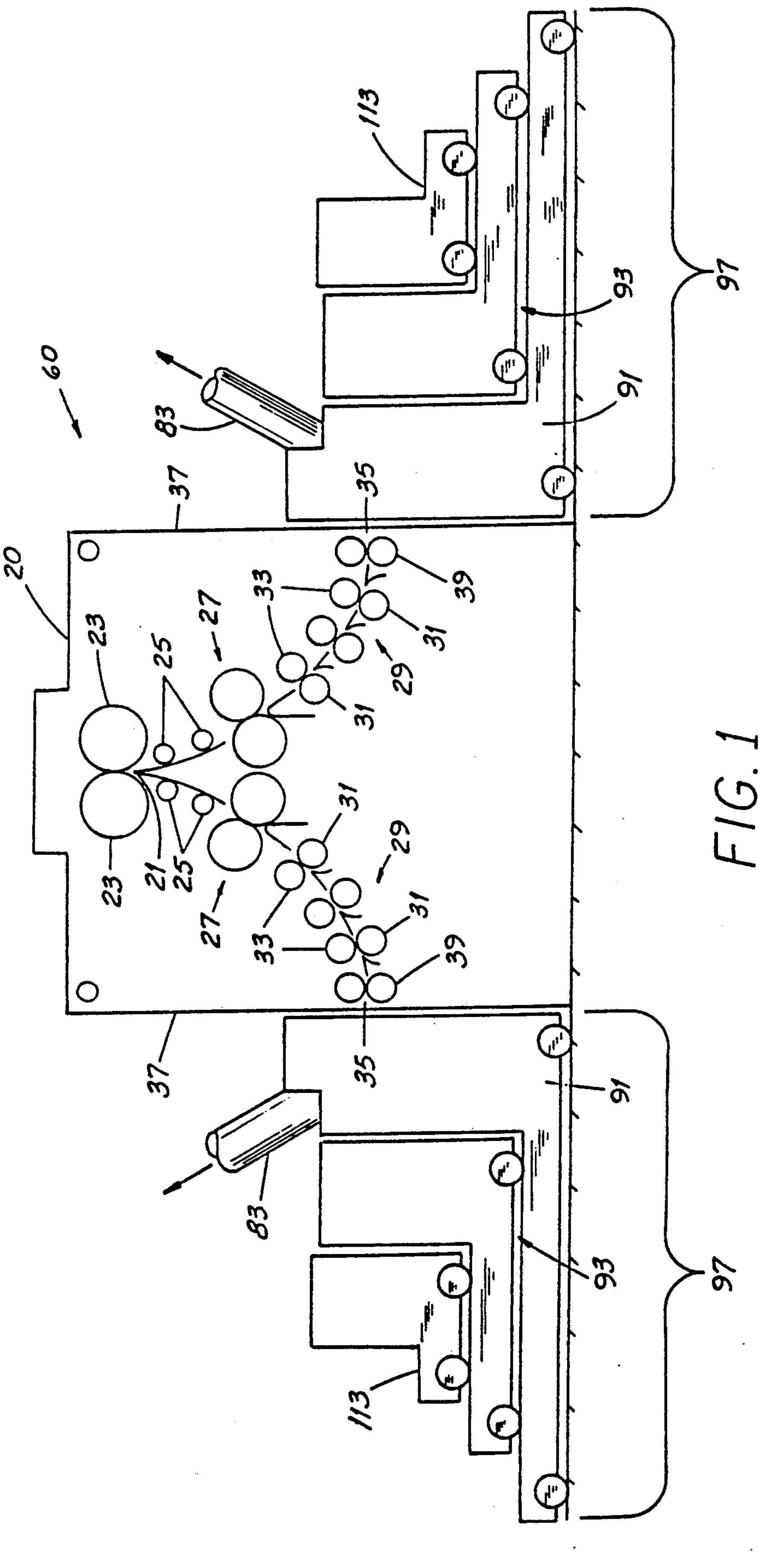
FIG. 1 is a schematic front elevation view indicating the location of the slitter apparatus of this invention in relationship to related components of a sugarcane separation system.

The figures show an improved sugarcane rind slitter apparatus 30. Slitter apparatus 30, as shown, is a part of a sugarcane separation line 60 which is illustrated in FIG. 1. Before turning to a description of the details of slitter apparatus 30 itself, it will be helpful to describe the separation line of which it is a part.

Separation line 60 includes a tower-like central unit 20 which is symmetrical in a "mirror-image" arrangement. Central unit 20 receives sugarcane stalk billets which are forced downwardly end-first onto a knife 21 by a pair of feed rolls 23, thereby splitting the billets longitudinally into half billets. The half billets, with the interior pith now exposed, are guided by rotating control brushes 25 into two depithing stations 27, one on either side of the unit 20. Each depithing station is followed by three dual-roll sets 29, each having brush and feed rolls 31 and 33, which serve a pith-diverting function. Fully depithed rind is then ejected from a port 35 at each wing 37 of the central unit 20 by a pair of rubber-clad grasping rolls 39.

FIG. 1 also shows two sets 97 of carriages which are positioned to receive and further process sugarcane rinds discharged from central unit 20. Each carriage set 97 has a primary carriage 91, a secondary carriage 93, and a tertiary carriage 113.

Each primary carriage 91 is adjacent to the central unit 20 and has a dermax-removing means which loosens the dermax and conveys it away through a tube 83. The output from the apparatus on primary carriage 61 is rind from which both pith and dermax have been removed.

Secondary carriage 93 carries slitter apparatus 30 of this invention, the details of which will hereafter be described by reference to FIGS. 2–5. Slitter apparatus 30 receives flattened rinds moving end-first in a generally horizontal direction. The output of the slitting operation may be removed for further processing, or may pass into the apparatus of tertiary carriage 113 for chipping or other treatment, depending on the intended end use.

We turn now to a description of slitter apparatus 30, as shown in FIGS. 2–5.

Slitter apparatus 30 includes a unique intermeshing disk configuration, including recesses 36 on the sides of disks 34 and flexible spacers 38 between disks 34. Slitter apparatus 30 has two sets of disks attached to parallel rotating shafts positioned such that the disk sets intermesh near their edges.

Figure 2:
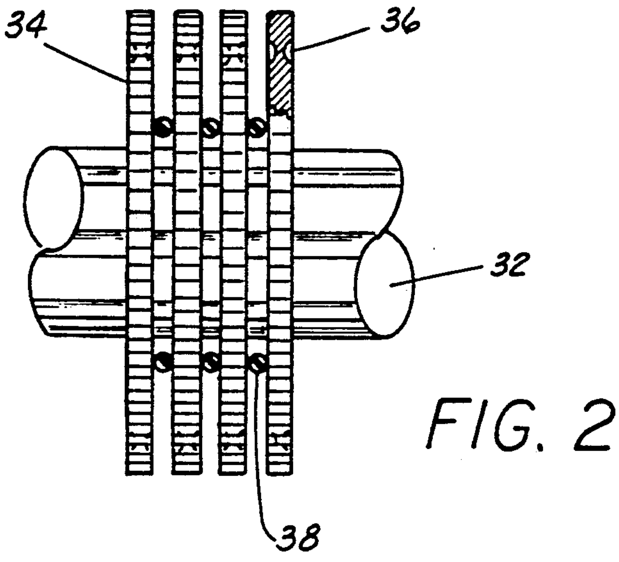
FIG. 2 is a partly-sectional radial view of one cylindrical rotating slitter member of an intermeshing pair of such members in accordance with this invention, such view expanded along its axial dimension and having a reduced number of disks and spacers to better illustrate features of the invention.

As best shown in FIG. 2, each disk 34 is attached to shaft 32, which extends therethrough, and is spaced apart from an adjacent disk by spacer 38. Recesses 36 on each side of disk 34 allow disks from the other disk set to intermesh and provide the improved slitting action of this invention.

Figure 3:
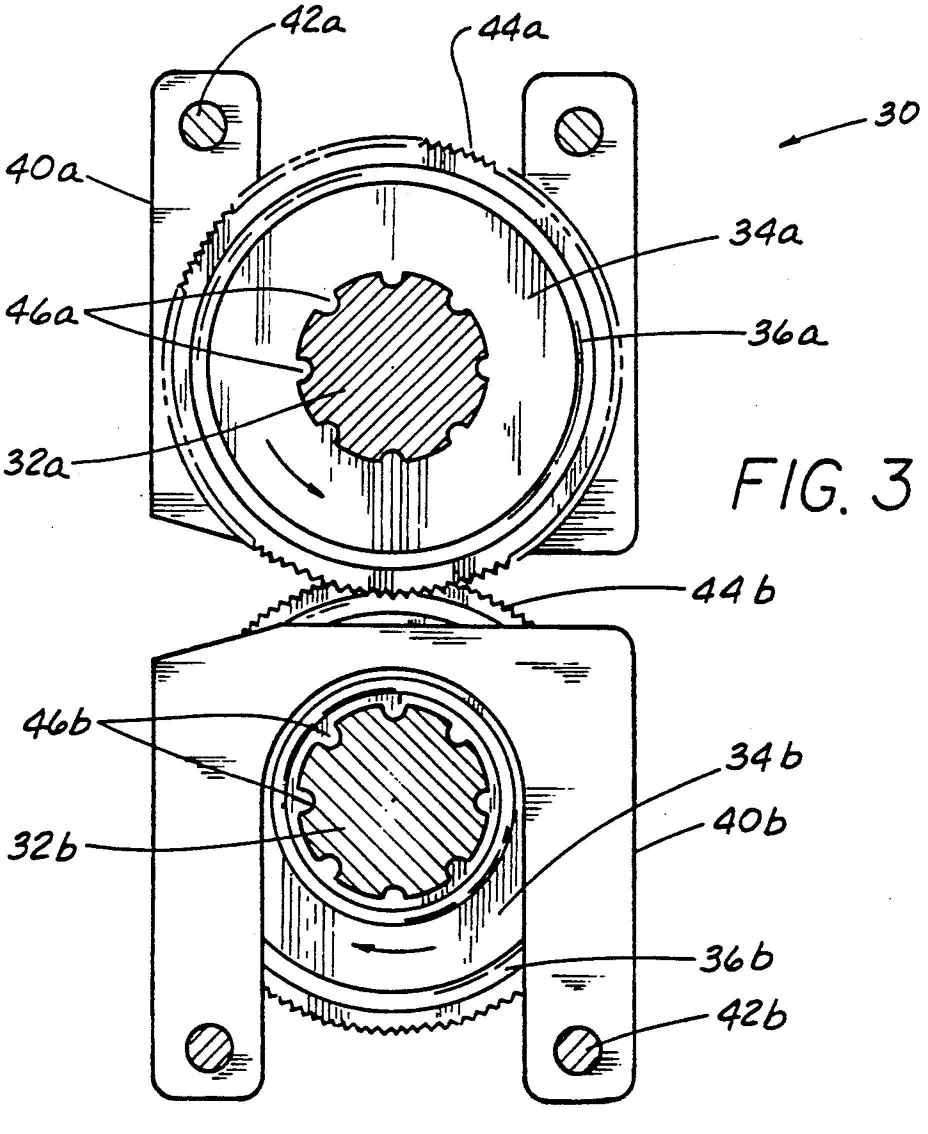
FIG. 3 is a cross-sectional axial view of an intermeshing pair of cylindrical slitter members.

As shown in FIG. 3, combs 40*a* and 40*b* are positioned between disks 34*a* and 34*b*, respectively. Comb support rods 42*a* and 42*b* position and secure combs 40 such that slit rind does not interfere with shafts 32*a* and 32*b*. Disks 34*a* and 34*b* are keyed to shafts 32*a* and 32*b* by way of splines 46*a* and 46*b*, respectively. Disks 34*a* and 34*b* have knurled edges 44*a* and 44*b*, respectively.

Figure 4:
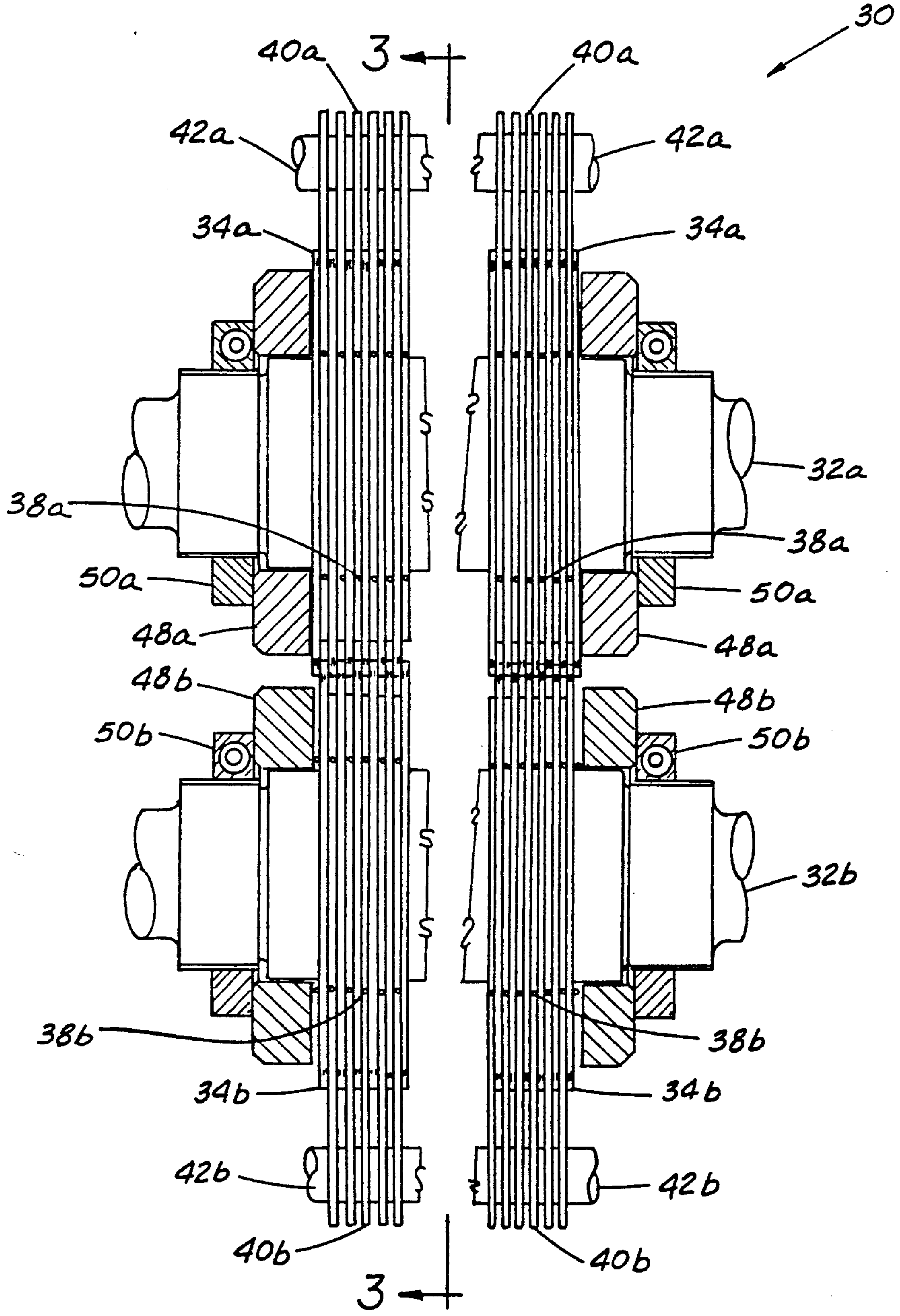
FIG. 4 is a partly-sectional radial view of an intermeshing pair of such slitter members together with related parts.

As best shown in FIG. 4, disks 34*a* and 34*b* are secured on shafts 32*a* and 32*b* by a disk-locator collar and locknut combination 48*a*/50*a* and 48*b*/50*b*, respectively. As disks wear axially, disk-locator the disks and spacers to maintain efficient slitting. Such adjustment is easily accomplished.

Figure 5:
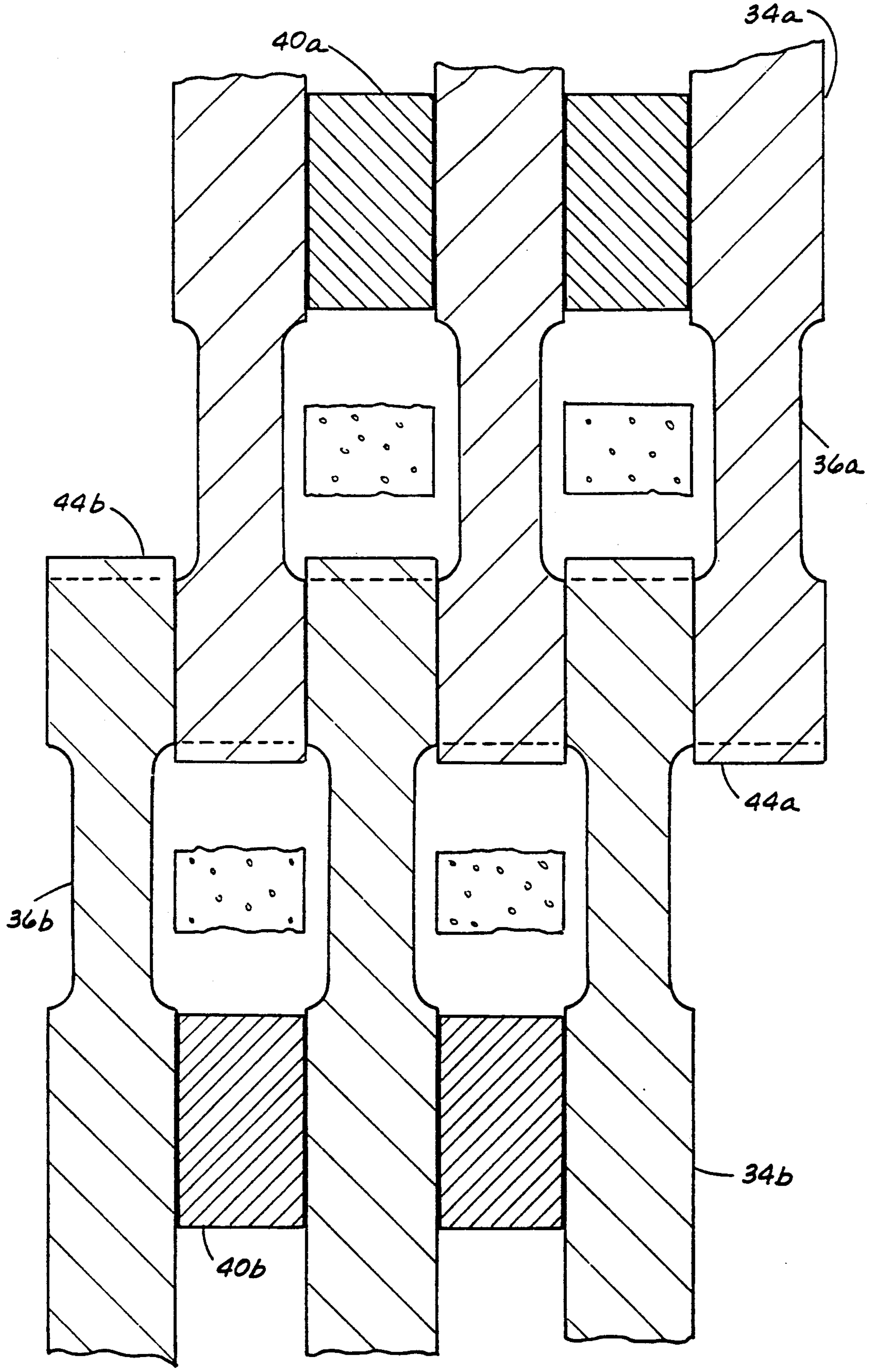
FIG. 5 is an enlarged fragmentary sectional view of the intermeshing disks.

As best shown in FIG. 5, sugarcane rind is slit into widths equal to the non-recessed width of each disk 34. Combs 40 prevent slit rind from accumulating between the disks, where they could interfere with slitting operations. Recesses 36*a* and 36*b* on disks 34*a* and 34*b*, respectively, have radial dimensions which accommodate rind of varying thicknesses. The knurled edges on each set of disks 44*a* and 44*b*, respectively, act to grip the rind and pull it through intermeshing disks 34*a* and 34*b*.

Disks 34 are preferably made of hard metals, while combs 40 may be made using a variety of softer materials, such as brass. Spacers 38 may be made using a variety of flexible, resilient materials, preferred materials including flexible silicones and rubber. Acceptable material choices will be apparent to those skilled in the art who are made aware of this invention.

In certain preferred embodiments, disk recesses 36 are dimensioned such that the resulting rind slits have a width of about 2.38 millimeters. Preferably, both sides of disks 34 are recessed axially about 0.38 millimeters. Preferably, such recesses begin about 0.38 millimeters from the peripheral edge of each disk and extend radially-inwardly about 4.75 millimeters therefrom.

This invention has been described in connection with a sugarcane rind slitting apparatus. However, the invention has applications beyond those described above, including but not limited to slitting other woody rinds such as that derived from sweet sorghum.

While the principles of this invention have been described in connection with specific embodiments, it should be understood clearly that these descriptions are made only by way of example and are not intended to limit the scope of the invention.

What is claimed is:

1. In sugarcane rind-slitting apparatus having a pair of counter-rotatable cylindrical members with a multiplicity of intermeshing annular projections each in face-to-face contact with adjacent projections, the improvement wherein each of the annular projections has two sides and a peripheral end, the sides axially recessed beginning at a radial position spaced from the peripheral end by a distance less than the radial extent of intermeshing overlap, such recessing extending radially inwardly at least to a position spaced from the peripheral end by a distance greater than the radial extent of intermeshing overlap.

2. The sugarcane rind-slitting apparatus of claim 1 wherein the axial dimension of the recessing is substantially greater than thicknesses of sugarcane rind, whereby clearing of slit rind from between the annular projections is facilitated.

3. The sugarcane rind-slitting apparatus of claim 1 wherein each cylindrical member comprises:

a shaft;

disks on the shaft forming the intermeshing annular projections; and flexible means on the shaft to space the intermeshing annular projections, whereby undue stress on the annular projections is relieved.

4. The sugarcane rind-slitting apparatus of claim 1 wherein the peripheral ends of the annular projections of both cylindrical members are knurled.

5. A sugarcane rind-slitting apparatus comprising:

a pair of counter-rotatable cylindrical members each having a shaft, a multiplicity of annular disks intermeshing with the disks of the other cylindrical member, and flexible means on the shaft to space the disks therealong;

each disk having two sides and a peripheral end, the sides axially recessed beginning at a radial position spaced from the peripheral end by a distance less than the radial extent of intermeshing overlap, such recessing extending radially inwardly at least to a position spaced from the peripheral end by a distance greater than the radial extent of intermeshing overlap; and means at ends of each of the shafts to tighten the disks and flexible spacer means in an axial direction along the shafts.

6. A sugarcane rind-slitting apparatus comprising:

a pair of counter-rotatable cylindrical members each having a shaft and a multiplicity of annular disks intermeshing with the disks of the other cylindrical member;

each disk having two sides and a peripheral end, the sides axially recessed beginning at a radial position spaced from the peripheral end by a distance less than the radial extent of intermeshing overlap, such recessing extending radially inwardly at least to a position spaced from the peripheral end by a distance greater than the radial extent of intermeshing overlap; and flexible means on each shaft to space the disks therealong, each such flexible spacer having an uncompressed axial dimension greater than the axial dimension of the peripheral end of the disk of the other cylindrical member which is received between the disks on either side of such spacer.

7. The sugarcane rind-slitting apparatus of claim 6 wherein the flexible spacers are O-rings engaging the shaft.

8. The sugarcane rind-slitting apparatus of claim 7 further including means at the shaft ends allowing axial tightening of the disks, thereby to allow adjustment after wear.

9. The sugarcane rind-slitting apparatus of claim 8 wherein the shaft has at least four splines thereon and the disks each have at least four tabs mating therewith, whereby disk cocking is avoided.

10. A sugarcane rind-slitting apparatus comprising a pair of counter-rotatable cylindrical members each having a shaft, a multiplicity of annular disks intermeshing with the disks of the other cylindrical member, each disk in face-to-face contact with adjacent disks of the other cylindrical member, and flexible means on the shaft to space the disks therealong, and means at end of each of the shafts to tighten the disks and flexible spacer means in an axial direction along the shafts, whereby axial adjustment is possible after wear and undue stress on the disks is relieved during slitting operations.

11. The sugarcane rind-slitting apparatus of claim 10 wherein each flexible spacer has an uncompressed axial dimension greater than the axial dimension of the peripheral end of the disk received between the disks on either side of such spacer.

12. The sugarcane rind-slitting apparatus of claim 10 wherein the peripheral ends of the annular projections of both cylindrical members are knurled.

13. The sugarcane rind-slitting apparatus of claim 11 wherein the flexible spacers are O-rings engaging the shaft.

14. The sugarcane rind-slitting apparatus of claim 13 wherein the shafts each have at least four splines thereon and the disks each have at least four tabs mating therewith, whereby disk cocking is avoided.

* * * * *

UNITED STATES PATENT AND TRADEMARK OFFICE
CERTIFICATE OF CORRECTION

PATENT NO. : 5,096,499

DATED : March 17, 1992

INVENTOR(S) : Sydney E. Tilby

It is certified that error appears in the above-identified patent and that said Letters Patent is hereby corrected as shown below:

In column 6, line 25, after "disk-locator" insert --collars 48a and 48b and locknuts 50a and 50b may compress--.

Signed and Sealed this

Twenty-fifth Day of May, 1993

Attest:

Michael K. Kirk

MICHAEL K. KIRK

Attesting Officer

*Acting Commissioner of Patents and Trademarks*